(12) United States Patent
Bandela et al.

(10) Patent No.: US 10,768,800 B2
(45) Date of Patent: Sep. 8, 2020

(54) SCROLLING SCORE GUIDE WITH QUICK TUNE FEATURE

(71) Applicant: The DIRECTV Group, Inc., El Segundo, CA (US)

(72) Inventors: Sudheer Bandela, Torrance, CA (US); Binny Asarikuniyil, Cerritos, CA (US); Hai Kim Nguyen, Torrance, CA (US); Heather Nga Truong, Anaheim, CA (US)

(73) Assignee: THE DIRECTV GROUP, INC., El Segundo, CA (US)

( * ) Notice: Subject to any disclaimer, the term of this patent is extended or adjusted under 35 U.S.C. 154(b) by 17 days.

(21) Appl. No.: 15/370,590

(22) Filed: Dec. 6, 2016

(65) Prior Publication Data

US 2018/0160167 A1 Jun. 7, 2018

(51) Int. Cl.
| | | |
|---|---|---|
| *H04N 21/235* | (2011.01) | |
| *H04N 5/445* | (2011.01) | |
| *G06F 3/0485* | (2013.01) | |
| *H04N 21/472* | (2011.01) | |
| *H04N 21/478* | (2011.01) | |
| *H04N 21/81* | (2011.01) | |
| *H04N 21/482* | (2011.01) | |
| *H04N 21/422* | (2011.01) | |
| *G06F 17/21* | (2006.01) | |

(52) U.S. Cl.
CPC ......... *G06F 3/0485* (2013.01); *H04N 21/478* (2013.01); *H04N 21/47217* (2013.01); *H04N 21/482* (2013.01); *H04N 21/8126* (2013.01)

(58) Field of Classification Search
None
See application file for complete search history.

(56) References Cited

U.S. PATENT DOCUMENTS

| | | | | |
|---|---|---|---|---|
| 5,959,621 | A * | 9/1999 | Nawaz | G06F 3/14 715/733 |
| 6,536,041 | B1 * | 3/2003 | Knudson | H04N 21/235 725/39 |
| 8,433,306 | B2 | 4/2013 | Rodriguez | |
| 8,914,496 | B1 * | 12/2014 | Richardson | G06N 5/04 709/224 |
| 8,949,895 | B2 | 2/2015 | Shanks et al. | |

(Continued)

OTHER PUBLICATIONS

"The iTV Doctor Is In: DirecTV's App Store and Widgets", Feb. 12, 2010, [http://itvt.com/itv_doctor/6473/itv-doctor-directvs-app-store-and-widgets%20], retrieved on Oct. 26, 2016, 3 pages.

*Primary Examiner* — Nasser M Goodarzi
*Assistant Examiner* — Terrika Peterson
(74) *Attorney, Agent, or Firm* — Amin, Turocy & Watson, LLP

(57) ABSTRACT

A scrolling score guide with quick tune feature is presented herein. A method can comprise displaying a group of identifiers representing event broadcasts with corresponding data of the event broadcasts as a scrolling window within a broadcast window of a broadcast being received by the system for display via the display device, and, in response to detecting, via a remote device, a selection of an identifier of the group of identifiers, receiving an event broadcast of the event broadcasts represented by the identifier, and displaying the event broadcast in the broadcast window.

20 Claims, 15 Drawing Sheets

(56) References Cited

U.S. PATENT DOCUMENTS

| | | | |
|---|---|---|---|
| 9,094,708 B2 | 7/2015 | Seyller et al. | |
| 9,179,086 B2 | 11/2015 | Abello et al. | |
| 9,344,768 B2 | 5/2016 | Knudson et al. | |
| 9,407,854 B2 | 8/2016 | Ellis et al. | |
| 9,451,316 B2 | 9/2016 | Leong et al. | |
| 2004/0078814 A1 | 4/2004 | Allen | |
| 2007/0271589 A1* | 11/2007 | Yogaratnam | H04N 7/173 |
| | | | 725/113 |
| 2008/0112690 A1 | 5/2008 | Shahraray et al. | |
| 2008/0120285 A1 | 5/2008 | Ruckart | |
| 2009/0037966 A1* | 2/2009 | Rolls | H04N 21/4622 |
| | | | 725/105 |
| 2011/0154200 A1* | 6/2011 | Davis | H04N 21/235 |
| | | | 715/716 |
| 2013/0317951 A1* | 11/2013 | Kuznetsov | G06F 17/30817 |
| | | | 705/27.1 |
| 2014/0164359 A1* | 6/2014 | Jeffery | G06F 17/212 |
| | | | 707/722 |
| 2014/0245148 A1* | 8/2014 | Silva | H04N 5/44591 |
| | | | 715/719 |
| 2014/0281012 A1 | 9/2014 | Troxler et al. | |
| 2015/0020125 A1* | 1/2015 | Adjemian | H04H 60/48 |
| | | | 725/86 |
| 2015/0067733 A1 | 3/2015 | Weber | |
| 2015/0150045 A1* | 5/2015 | Shovkoplias | H04N 21/44222 |
| | | | 725/34 |
| 2015/0201247 A1 | 7/2015 | Henderson | |
| 2016/0050445 A1* | 2/2016 | Baghdassarian | H04N 21/2187 |
| | | | 725/109 |
| 2016/0205420 A1* | 7/2016 | Ellis | H04N 5/44543 |
| | | | 725/53 |
| 2016/0239317 A1* | 8/2016 | Cuddihy | G06F 9/44526 |
| 2017/0127143 A1* | 5/2017 | Knudson | H04N 21/4886 |
| 2017/0155946 A1* | 6/2017 | Coenen | H04N 21/42224 |

* cited by examiner

SCROLLING SCORE GUIDE WITH QUICK TUNE FEATURE

TECHNICAL FIELD

The subject disclosure generally relates to a scrolling score guide with a quick tune feature, e.g., as enabled by network devices for subscriber devices, such as set top boxes or other video streaming devices.

BACKGROUND

Users of broadcast services often desire real-time updates of scores of their favorite sports teams. However, conventional set-top box (STB) technologies limit the ability of viewers to obtain scores of multiple teams of interest in real time, and such users often switch to use of their mobile devices to obtain scores, access game information, related broadcasts, etc. Consequently, conventional STB technologies have had some drawbacks, some of which may be noted with reference to the various embodiments described herein below.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Figure 1:
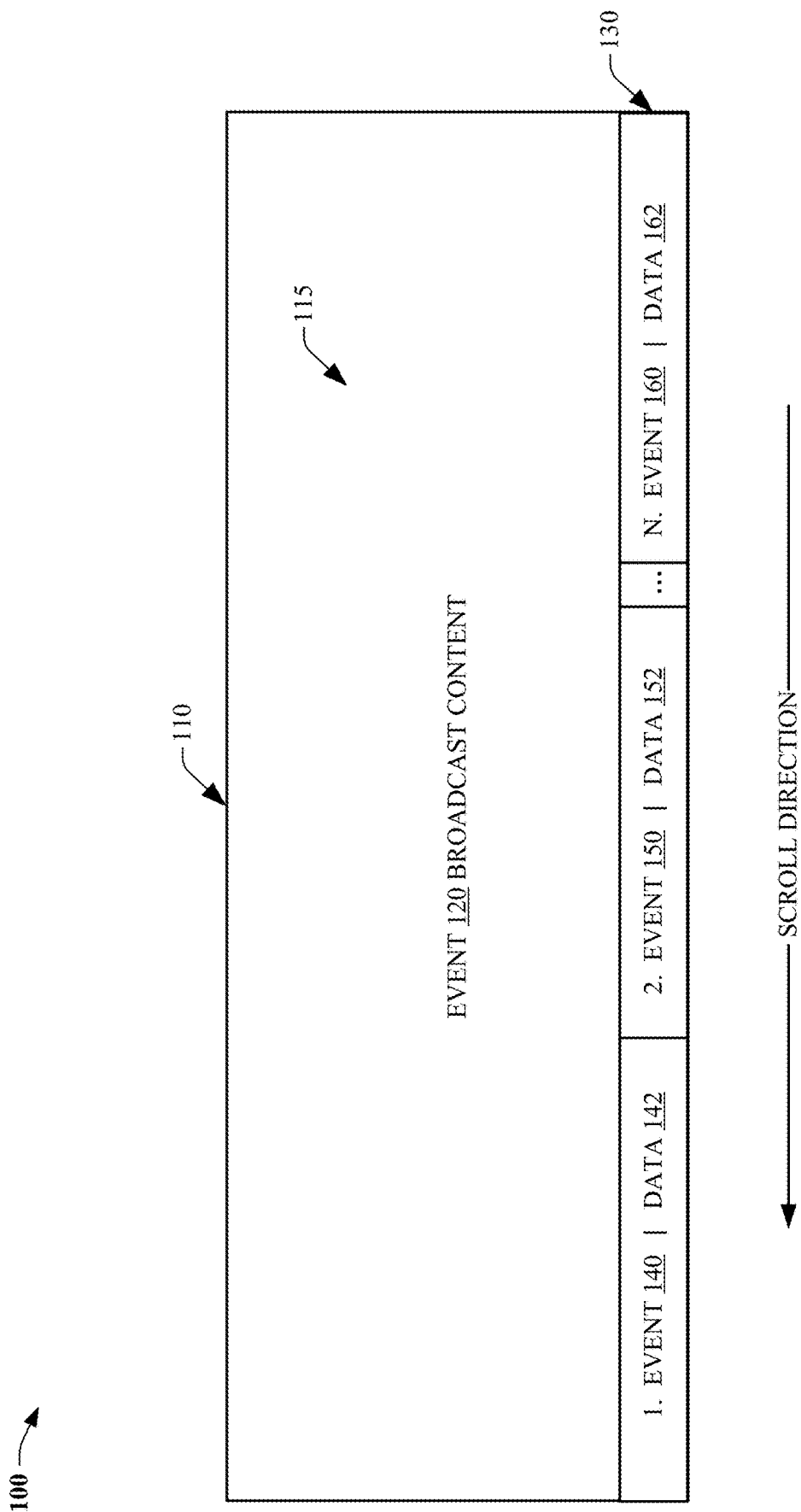
FIG. 1 illustrates a block diagram of a display comprising a scrolling score guide, in accordance with various example embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

As described above, conventional STB technologies have had some drawbacks with respect to enabling viewers of a broadcast to efficiently access other broadcasts, e.g., of sporting events, in real time. Various embodiments disclosed herein can enable "quick tuning", or access, of a broadcast, e.g., a sporting event, that has been identified from a scrolling guide, e.g., score guide, that has been displayed within a display of a broadcast being received by an STB. In this regard, viewers can efficiently access, or tune to, a broadcast of interest, e.g., a sporting event, by selecting an identifier displayed within the scrolling score guide corresponding to the sporting event.

For example, a method can comprise displaying, by an STB via a display device, e.g., a television (TV), a scrolling window within a broadcast window of a broadcast currently being received by the STB and being displayed within the broadcast window. The scrolling window can comprise a group of identifiers, e.g., numbers, letters, words, symbols, etc. representing event broadcasts of events, e.g., sporting events, with corresponding data of the events, e.g., scores of teams participating in the sporting events.

In this regard, the method can further comprise receiving, by the STB, an event broadcast of the event broadcasts and displaying, via the display device, the event broadcast in the broadcast window in response to detecting, via a remote device, e.g., a remote control, a selection of an identifier of the group of identifiers that has been displayed in the scrolling window representing the event broadcast.

In an embodiment, the displaying of the event broadcast can comprise splitting the broadcast window into a first broadcast window and a second broadcast window, displaying the broadcast in the first broadcast window, and displaying the event broadcast in the second broadcast window.

In one embodiment, the method can further comprise receiving, by the STB, the corresponding data of the events as hypertext markup language (HTML) file(s); and storing, by the STB, the HTML file(s) in a data storage device, e.g., a memory, a flash memory, a disk drive, etc.

In another embodiment, the method can further comprise receiving, by the STB, an input for associating an entity, e.g., a sports team, with a group of entities, e.g., a group of sports teams—the event broadcasts comprising broadcasts of games of the sports teams—and sending, by the STB, a request to a network device of a data streaming service, e.g., a direct-broadcast satellite television service, for facilitating a reception of an update of the corresponding data, e.g., scores of the games, from the network device.

In yet another embodiment, the method can further comprise repeatedly, periodically, etc. receiving, by the STB, respective updates of the corresponding data, e.g., scores of the games, from the network device.

In an embodiment, the detecting of the selection of the identifier that has been displayed in the scrolling window comprises displaying, by the STB via the display device, a selection option menu for facilitating selection of respective options comprising a record option to record content of the event broadcast, e.g., while the broadcast that is currently being received by the system is displayed by the display device.

In one embodiment, the displaying of the selection option menu comprises displaying the selection option menu for facilitating selection of respective options comprising a tune, quick tune, etc. option to facilitate the receiving of event broadcast and the displaying of the event broadcast in the broadcast window—upon detection of the selection of the identifier that has been displayed in the scrolling window.

In another embodiment, the method can further comprise displaying, by the STB via the display device based on a defined schedule, e.g., corresponding to respective initiations of the event broadcasts, a message, broadcast message, etc. within the scrolling window representing a starting time, e.g., of the respective initiations, of at least a portion of the event broadcasts.

Yet another embodiment can comprise a system, e.g., an STB based system, comprising a processor and a memory that stores executable instructions that, when executed by the processor, facilitate performance of operations, comprising: displaying first content of a first broadcast received by the system in a first area of a display; receiving data corresponding to broadcasts other than the first broadcast; facilitating scrolling of a first portion of the data and a second portion of the data in a second area of the display—the first portion comprising respective identifiers of the broadcasts, and the second portion comprising respective information of the broadcasts; and receiving the second broadcast and displaying second content of the second broadcast in the first area of the display in response to detecting a selection of an identifier of the respective identifiers representing a second broadcast of the broadcasts.

In embodiment(s), the broadcasts comprise: a sports event of a defined team, in which the respective information comprises a score of the sports event, and the second broadcast comprises a broadcast corresponding to, associated with, of, etc. the sports event; an election event of a defined entity, e.g., candidate, voter initiative, etc., in which the respective information comprises a result of the election event, and the second broadcast comprises a broadcast corresponding to, associated with, of, etc. the election event; a financial market event of a defined entity, e.g., stock, currency, market index, commodity, precious metal, etc., in which the respective information comprises a result of the financial market event, and the second broadcast comprises a broadcast, e.g., news broadcast, etc. corresponding to the financial market event; a celebrity reality competition event, in which the respective information comprises a result of such event, and the second broadcast comprises a broadcast corresponding to the celebrity reality competition event; and/or an award ceremony, e.g., an Academy Awards ceremony, corresponding to a defined entity, in which the respective information comprises a result of the award ceremony, and the second broadcast comprises a broadcast corresponding to the award ceremony.

In an embodiment, the operations can further comprise dividing the first area of the display into a first display window and a second display window—the displaying of the first content comprising displaying the first content of the first broadcast in the first display window, and the displaying of the second content comprising displaying the second content of the second broadcast in the second display window.

In one embodiment, the operations can further comprise associating, based on an input, an entity, e.g., a sports team, with a watch group, e.g., group of "favorite sports teams"—the broadcasts comprising event broadcasts of events, e.g., sporting events, corresponding to the watch group.

In another embodiment, the operations can further comprise receiving, at different times, HTML files representing the data; and storing the HTML files in a data storage device.

In yet another embodiment, the operations can further comprise displaying a selection menu for facilitating selection of respective options comprising a record option to record the second content; and in response to detecting a selection of the record option, recording the second content in a storage device to facilitate playback of the second content from the storage device.

One embodiment can comprise a machine-readable storage medium, comprising executable instructions that, when executed by a processor, facilitate performance of operations, comprising: displaying first content of a first broadcast in a viewing area; displaying, in a scrolling portion of the viewing area, first information comprising an identifier for facilitating a display, in the viewing area, of second content of a second broadcast; displaying, in the scrolling portion of the viewing area, second information corresponding to the second content; and in response to detecting a selection of the identifier, displaying the second content of the second broadcast in the viewing area.

In an embodiment, the displaying of the first content comprises displaying the first content in a first portion of the viewing area, and the displaying of the second content comprises displaying the second content in a second portion of the viewing area.

In another embodiment, the displaying of the second information comprises displaying the second information in response to receiving an HTML file comprising the second information.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Referring now to FIGS. 1-4, a block diagram (100) of a display comprising a scrolling score guide, a display comprising a selected event broadcast, a block diagram of a satellite-based STB environment, and a block diagram of an STB are illustrated, respectively, in accordance with various example embodiments. STB 310 comprises processor 410, memory 420, storage device 430, and interface component 440. In this regard, processor 410 can execute instructions stored in memory 420 to facilitate operations described herein that are performed by STB 310. For example, in various embodiment(s), STB 310 can receive, via satellite receiver 304 (e.g., a satellite dish), satellite data representing wireless broadcasts 302 received from a satellite (not shown), e.g., comprising content of a broadcast streaming service, e.g., a direct-broadcast satellite television service. Further, interface component 440 can wirelessly couple, via wireless interface 305, STB 310 to remote device 320 in order to detect a request, input, etc. received from a user, e.g., for selecting, viewing, etc. a broadcast stream of wireless broadcasts 302.

The broadcast stream can comprise, e.g., a movie, a TV broadcast, a news broadcast, a sports broadcast, an election broadcast, a financial market broadcast (e.g., stock market news), a celebrity reality competition broadcast, an award ceremony broadcast (e.g., an Academy Awards ceremony), etc. Further, STB 310 can be communicatively coupled to display 110, e.g., a TV, a display device, a monitor, etc. to facilitate viewing of content of the broadcast stream.

As illustrated by FIG. 1, STB 310 can display, within broadcast window 115 of display 110, content of the broadcast stream, e.g., a sporting event, event 120, etc. that is being received by STB 310. Further, STB 310 can display, within broadcast window 115 of display 110, scrolling window 130 comprising a group of identifiers ("1. EVENT 140", "2. EVENT 150", "N. EVENT 160") representing event broadcasts of events (140, 150, 160), e.g., football games, basketball games, soccer games, hockey games, financial market events, election events, TV show events, etc. Furthermore, scrolling window 130 comprises data (142, 152, 162) of the event broadcasts, e.g., scores of the football games, scores of the basketball games, scores of the soccer games, scores of the hockey games, financial market data, election data, TV contest results, etc.

In an embodiment, scrolling window 130 can scroll the group of identifiers and the data of the event broadcasts from the right of display 110 to the left of display 110. In another embodiment, scrolling window 130 can scroll the group of identifiers and the data of the event broadcasts from the left of display 110 to the right of display 110. In other embodiments, scrolling window 130 can scroll the group of identifiers and the data of the event broadcasts from the top/bottom of display 110 to the bottom/top of display 110.

In one embodiment, an event (120, 140, 150, 160) can comprise a sports event of a team of a group of events, entities, teams, etc. that a user of STB 310 has registered with STB 310. In this regard, as described below, STB 310 can receive, from the user, an input for associating the team with the group of teams, and display, via scrolling window 130, at least a portion of the group of identifiers representing broadcasts of games corresponding to the group of teams, and scores of the games.

In another embodiment, the event can comprise an election event, e.g., of a candidate, a voter initiative, etc. of a group of events, entities, etc. that the user has registered with STB 310, and STB 310 can display, via scrolling window 130, at least a portion of the group of identifiers representing broadcasts of election events corresponding to the group of events, and results of the election events.

In yet another embodiment, the event can comprise a financial market event of a defined entity, e.g., stock, currency, market index, commodity, precious metal, etc. of a group of events, entities, etc. that the user has registered with STB 310, and STB 310 can display, via scrolling window 130, at least a portion of the group of identifiers representing broadcasts of financial market events corresponding to the group of entities, and results of the financial market events.

In one embodiment, the event can comprise a celebrity reality competition event of a group of events, entities, etc. that the user has registered with STB 310, and STB 310 can display, via scrolling window 130, at least a portion of the group of identifiers representing broadcasts of celebrity reality competition events corresponding to the group of entities, and results of the celebrity reality competition events.

In an embodiment, the event can comprise an award ceremony, e.g., an Academy Awards ceremony, of a group of events, entities, etc. that the user has registered with STB 310, and STB 310 can display, via scrolling window 130, at least a portion of the group of identifiers representing broadcasts of award ceremonies corresponding to the group of entities, and results of the awards ceremonies.

It should be appreciated by a person of ordinary skill in the art of broadcast receiver devices having the benefit of the instant disclosure that scrolling window 130 can display identifiers of disparate events (e.g., sports events, election events, and/or other events), and corresponding information of the disparate events, which correspond to events, entities, etc. that have been registered with STB 310 to be displayed within scrolling window 130. In this regard, in embodiment(s), STB 310 can display, via display device 110 within scrolling window 130, identifiers representing sports event(s), election event(s), financial market event(s), TV show event(s), etc. that a viewer has registered, via STB 310, to be displayed within scrolling window 130.

Returning now to FIGS. 2, 3, and 4, interface component 440 of STB 310 can detect, via wireless interface 305 communicatively coupling STB 310 to remote device 320 (e.g., a remote control), a selection of an identifier (e.g., "2") that has been displayed within scrolling window 130 representing an event broadcast of an event, e.g., event 150 (e.g., a sporting event). In turn, STB 310 can receive, tune into, etc. the event broadcast of event 150, and display, via display device 110, content of the event broadcast of event 150 in broadcast window 115.

Figure 2:
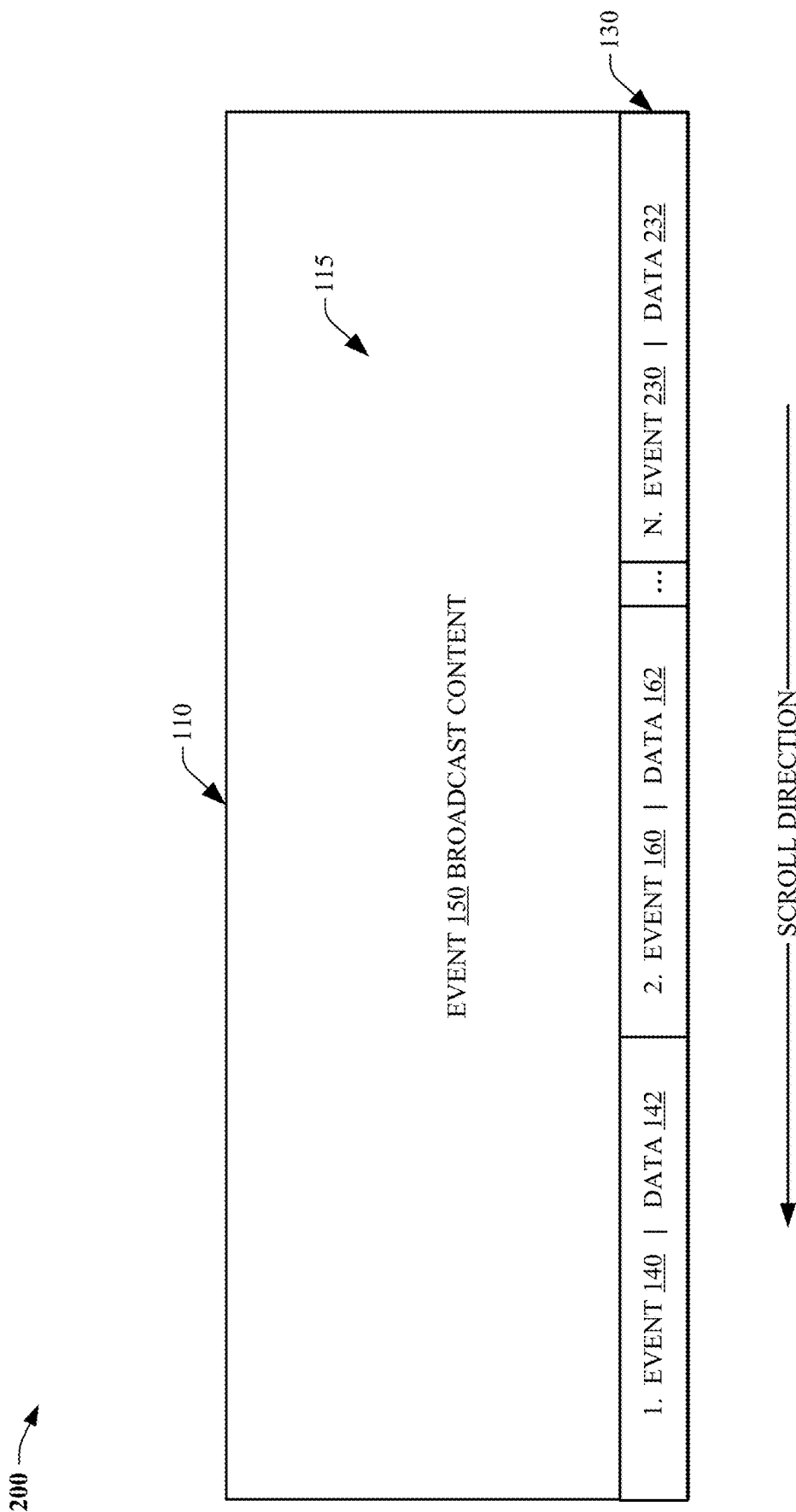
FIG. 2 illustrates a block diagram of a display comprising a selected broadcast, in accordance with various example embodiments.
Figure 3:
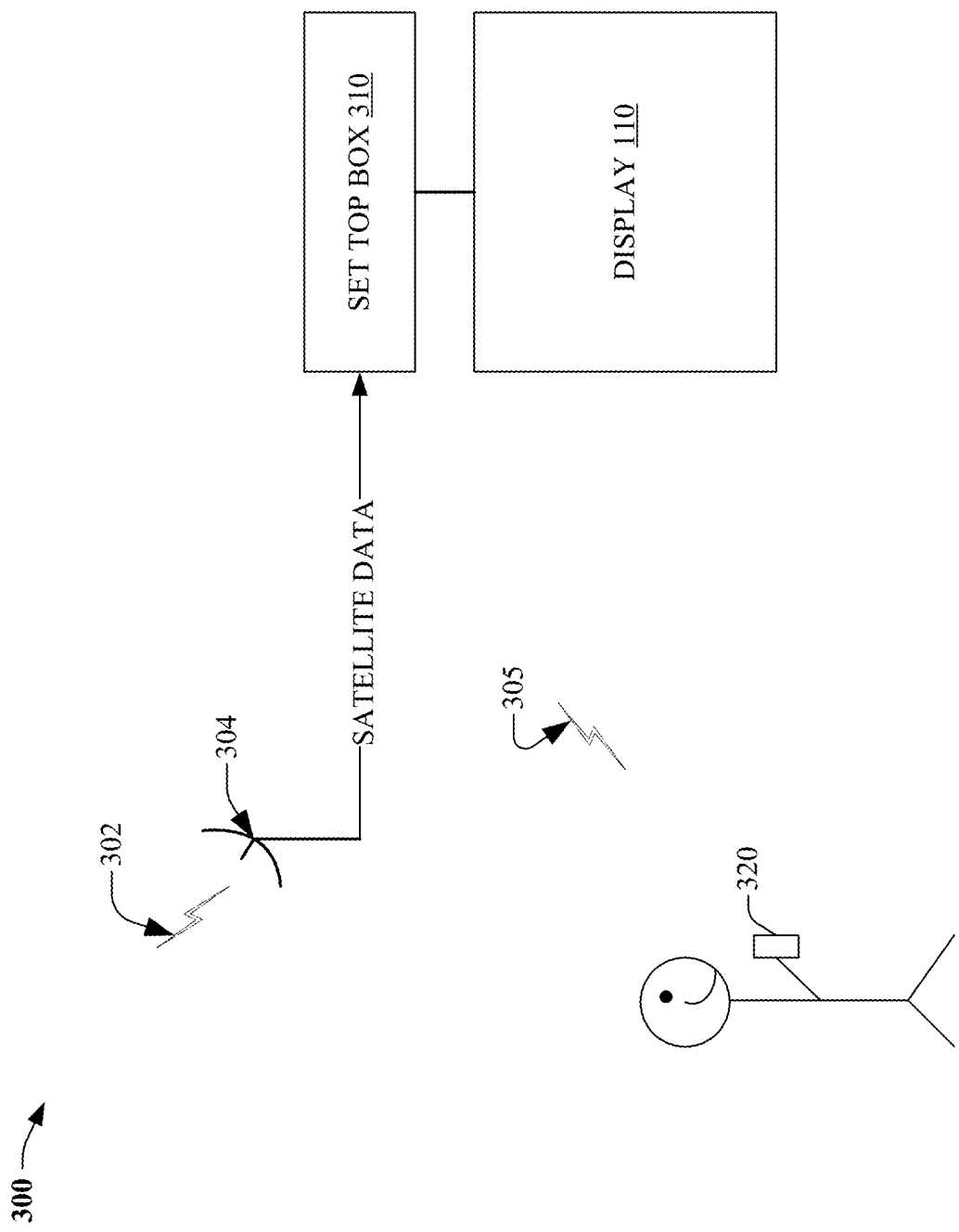
FIG. 3 illustrates a block diagram of a satellite-based STB environment, in accordance with various example embodiments.
Figure 4:
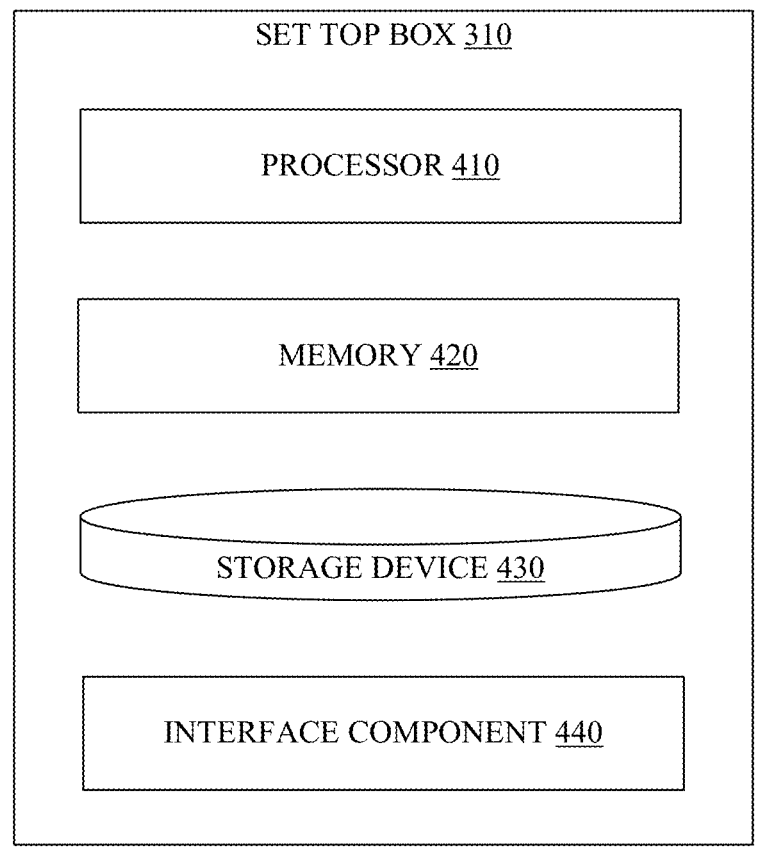
FIG. 4 illustrates a block diagram of an STB, in accordance with various example embodiments.

In one embodiment illustrated by FIG. 2, in response to displaying the content of the event broadcast of event 150 in broadcast window 115, STB 310 can replace, within broadcast window 150, information representing event 150 with other information representing another event broadcast, e.g., event 230 and data 232 corresponding to event 230.

Figure 5:
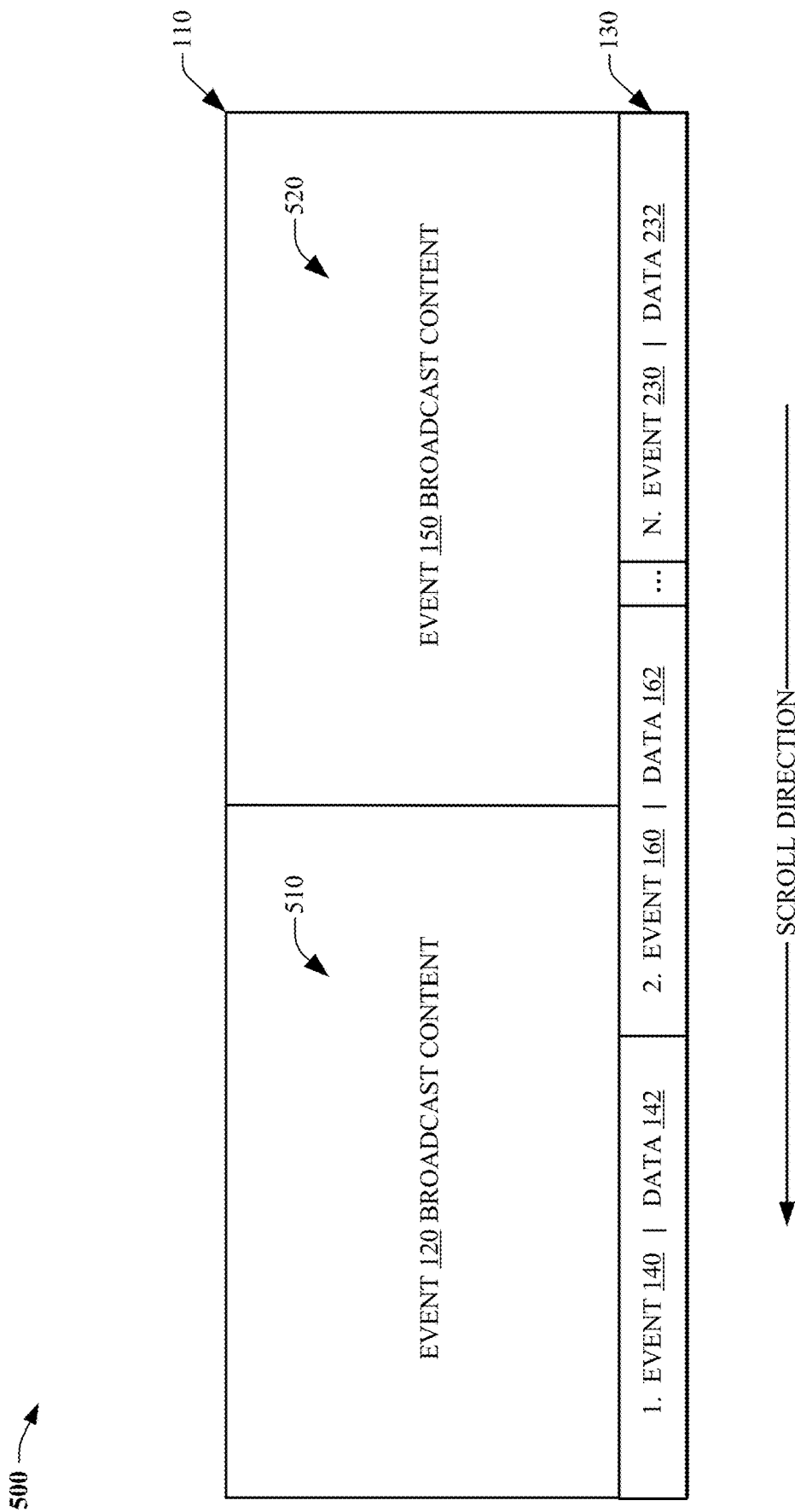
FIG. 5 illustrates a block diagram of a display comprising multiple broadcast windows, in accordance with various example embodiments.

Referring now to an embodiment illustrated by FIG. 5, in response to detecting the selection of the identifier representing the event broadcast of event 150, STB 310 can divide broadcast window 115 into display window 510 and display window 520, display the content of the broadcast stream of event 120 in display window 510, and display content of the event broadcast of event 150 in display window 520—display window 510 and display window 520 being tiled from left to right within display device 110.

Figure 6:
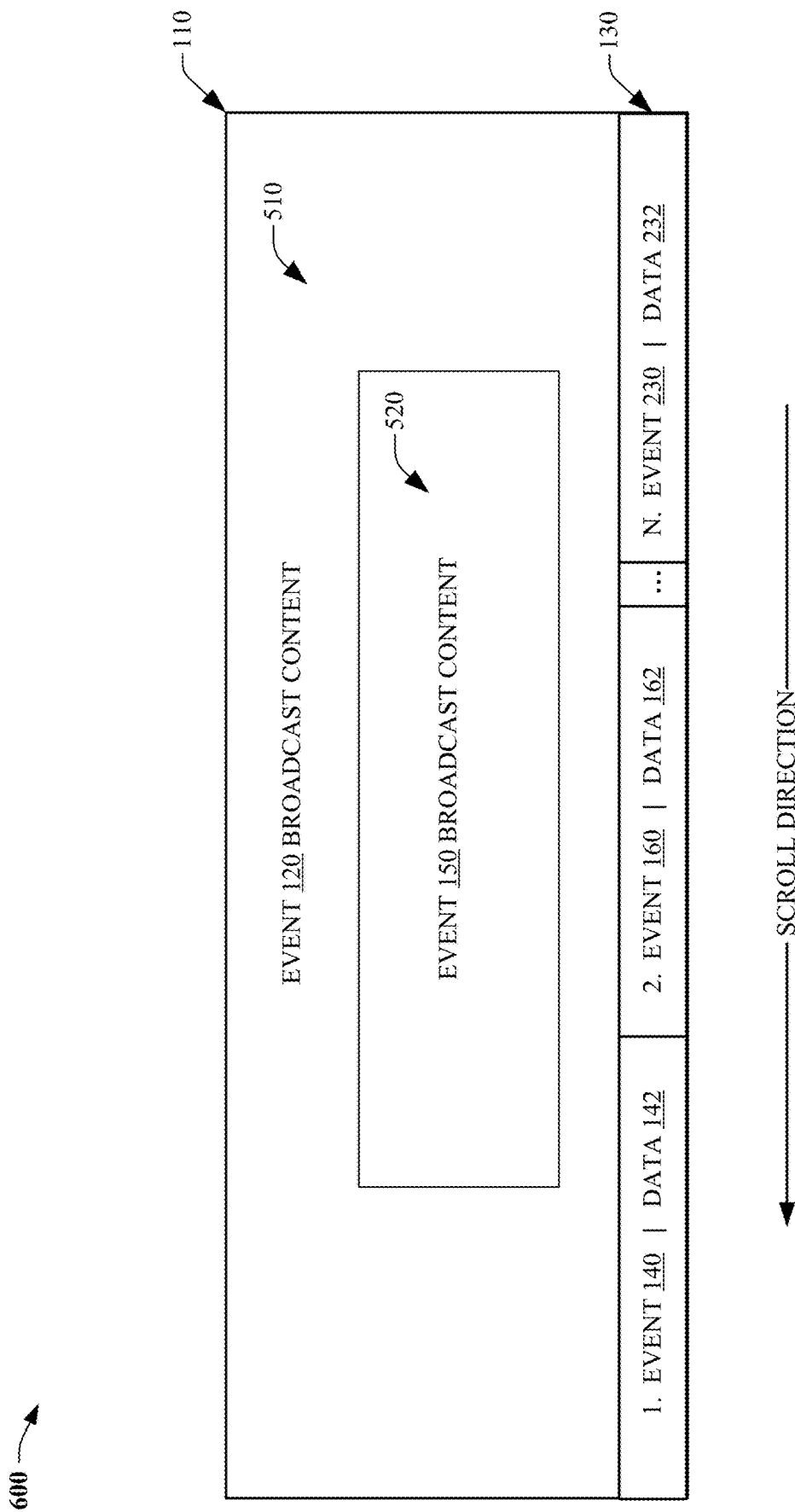
FIG. 6 illustrates a block diagram of a display comprising a broadcast window within another broadcast window, in accordance with various example embodiments.

In an embodiment illustrated by FIG. 6, STB 310 can display the content of the event broadcast of event 150 in display window 520—display window 520 being displayed within display window 510.

Figure 7:
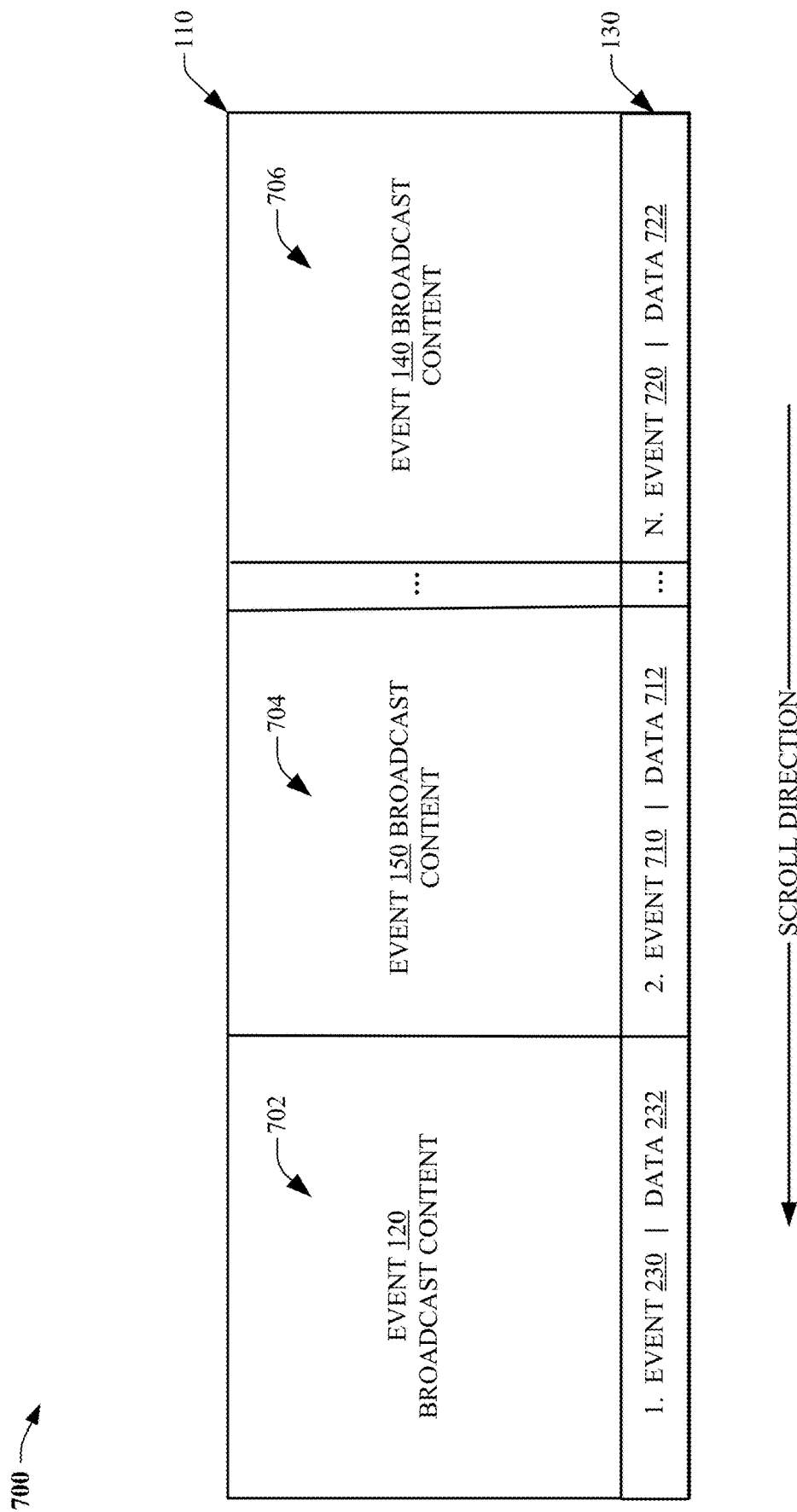
FIG. 7 illustrates a block diagram of another display comprising multiple broadcast windows, in accordance with various example embodiments.

In yet another embodiment illustrated by FIG. 7, STB 310 can display more than two display windows (702, 704, 706, etc.) from left to right within display device 110 in a tiled manner. In this regard, STB 310 can display the content of the broadcast stream of event 120 in display window 702, the content of the broadcast stream of event 150 in display window 704, and the content of a broadcast stream of event 140 in display window 706—in response to detecting, via remote device 320, selections of identifiers displayed within scrolling window 130 corresponding to event 120, event 150, event 140, etc.

Figure 8:
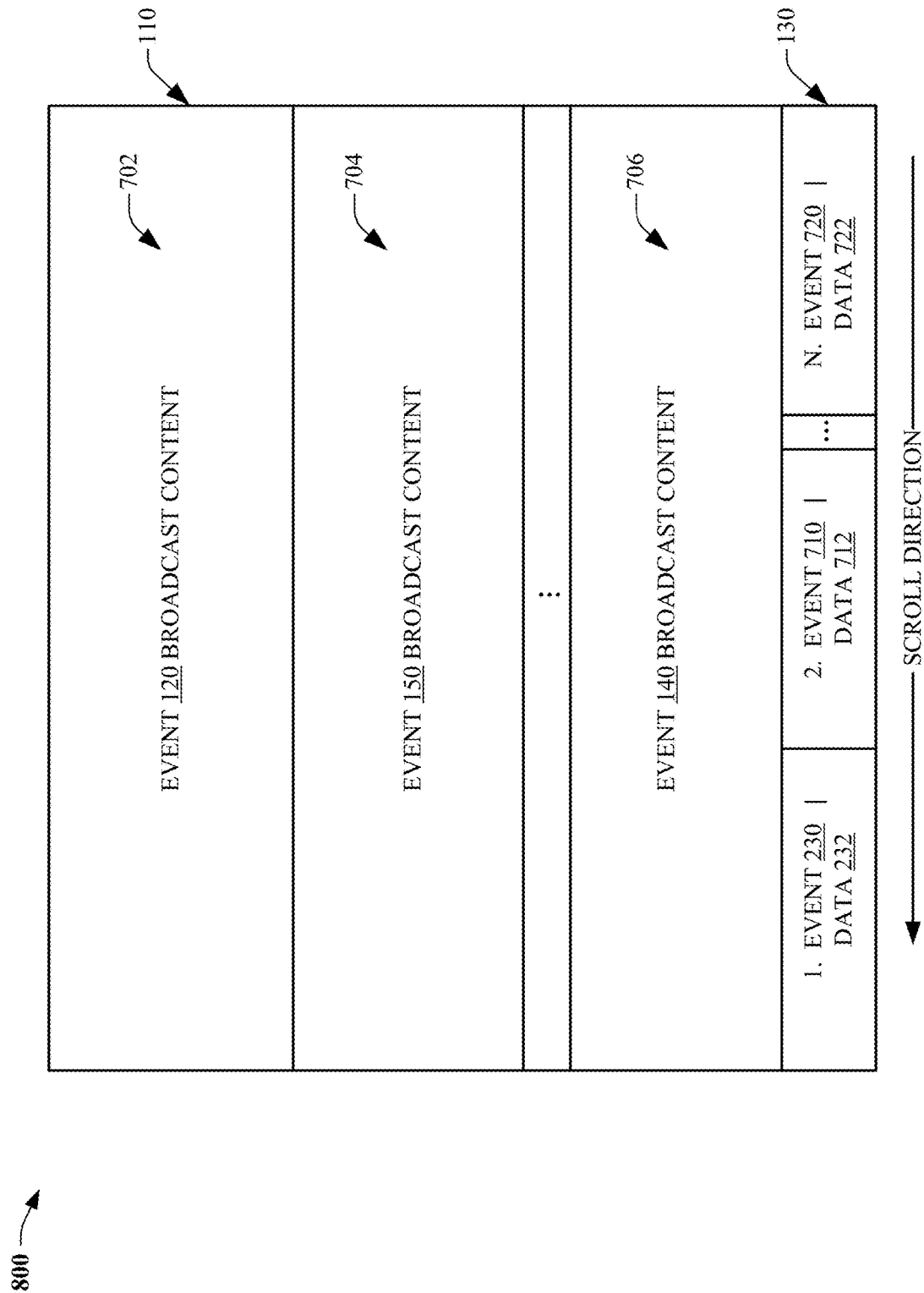
FIG. 8 illustrates a block diagram of yet another display comprising multiple broadcast windows, in accordance with various example embodiments.

In an embodiment illustrated by FIG. 8, STB 310 can display more than two display windows (702, 704, 706, etc.) from top to bottom within display device 110 in a tiled manner. In this regard, STB 310 can display the content of the broadcast stream of event 120 in display window 702, the content of the broadcast stream of event 150 in display window 704, and the content of a broadcast stream of event 140 in display window 706—in response to detecting, via remote device 320, selections of identifiers displayed within scrolling window 130 corresponding to event 120, event 150, event 140, etc.

Figure 9:
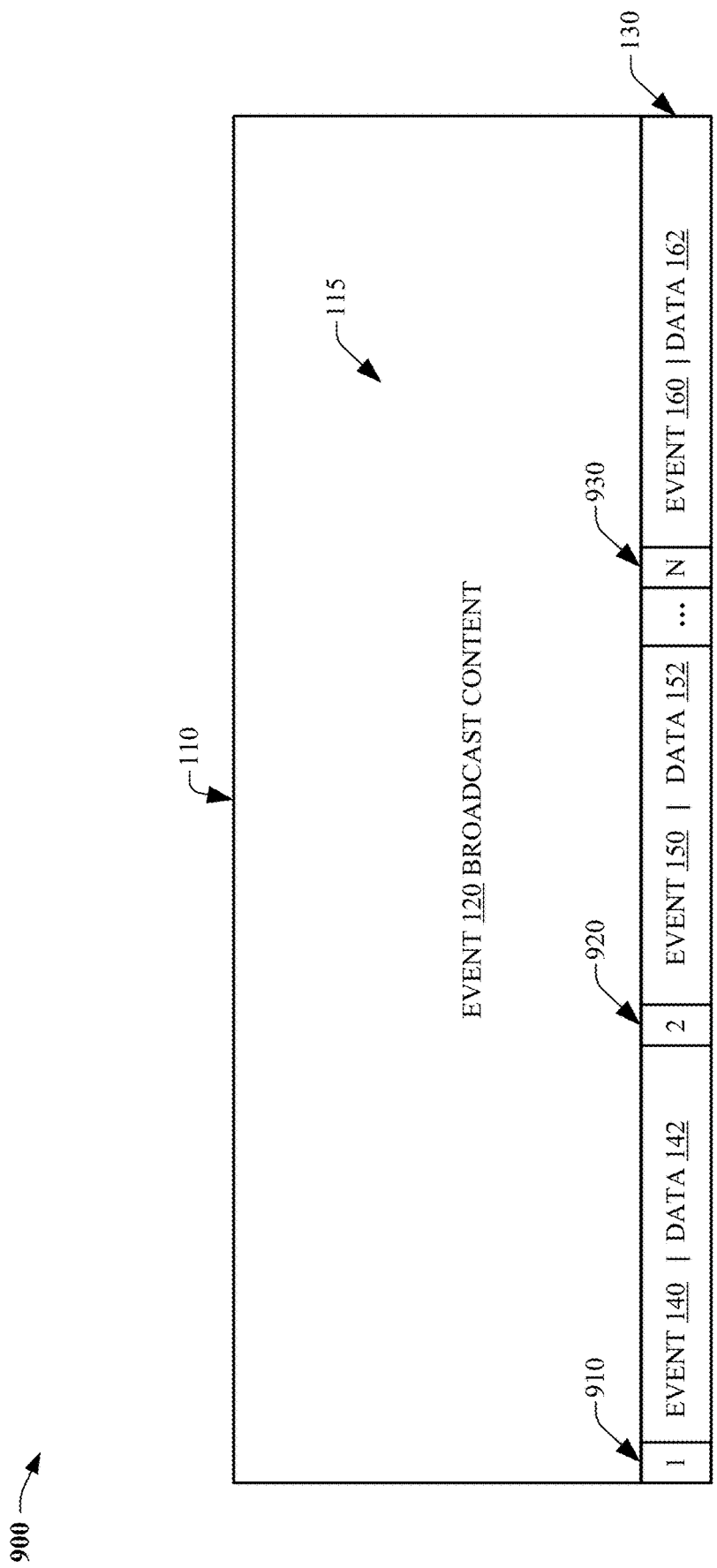
FIG. 9 illustrates a block diagram of a display comprising graphical control elements, in accordance with various example embodiments.
Figure 10:
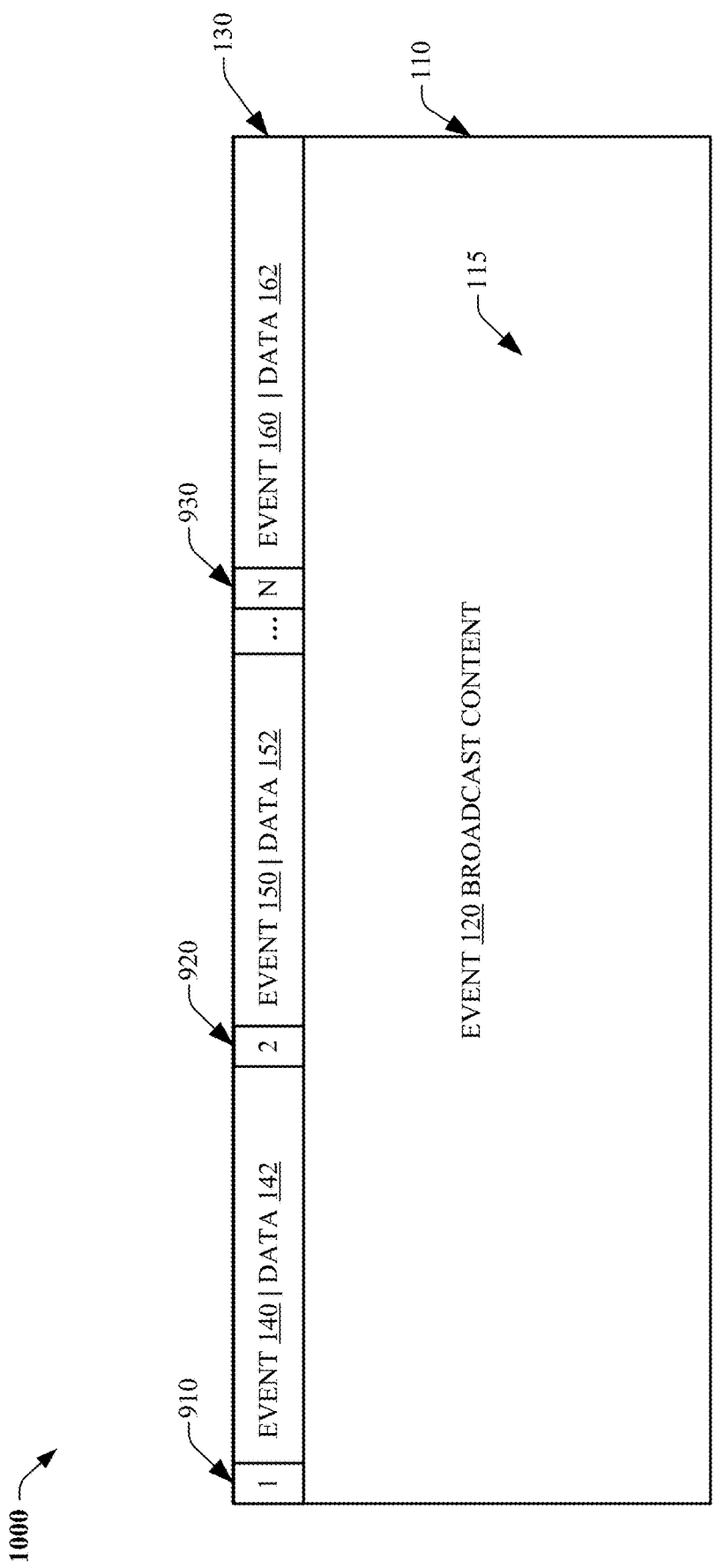
FIG. 10 illustrates a block diagram of another display comprising graphical control elements, in accordance with various example embodiments.

FIGS. 9 and 10 illustrate block diagrams (900, 1000) of displays comprising graphical control elements, or widgets, in accordance with various example embodiments. A widget (910, 920, 930) is an element of interaction in a graphical user interface (GUI), e.g., of display device 110. In this regard, the widget can comprise a software component of display device 110 that facilitates selection, by a viewer, of an identifier that has been displayed within the widget in scrolling window 130—the identifier representing an event broadcast that can be selected to be tuned, received, displayed, etc. by STB 130.

In an embodiment, in response to detecting, via wireless interface 305 based on position information of remote device 320, that a cursor (not shown) being displayed on display device 110—according to the position information—has been positioned over portions(s) of a display of a widget (e.g., 930), interface component 440 of STB 310 can detect a selection of an identifier (e.g., "N") that has been displayed, via the widget, within scrolling window 130. In turn, STB 310 can receive, tune to, etc. an event broadcast (e.g., of event 160) corresponding to the identifier, and display, via display device 110, content of the event broadcast in broadcast window 115.

Figure 11:
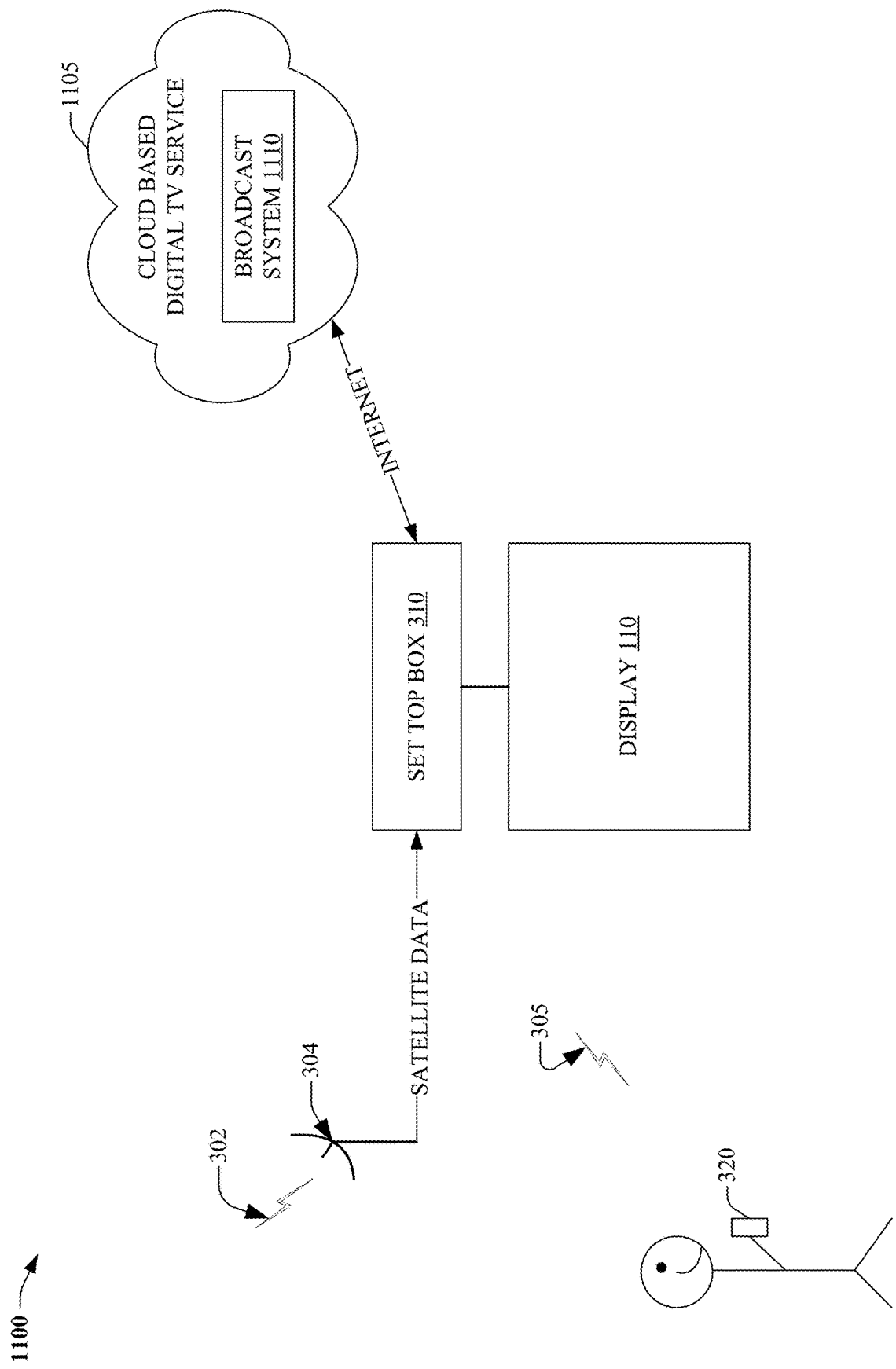
FIG. 11 illustrates a block diagram of another satellite-based STB environment, in accordance with various example embodiments.

Referring now to FIG. 11, a block diagram (1100) of a scrolling score guide environment is illustrated, in accordance with various example embodiments. In this regard, in one embodiment, STB 310 can receive, via broadcast system 1110 of cloud based digital TV service 1105, e.g., periodically, at different times, etc. based on broadcast program schedules of event broadcasts (140, 150, 160, 230, 710, 720), respective data (142, 152, 162, 232, 712, 722) corresponding to the event broadcasts as HTML file(s), and store the HTML file(s) in a data storage device, e.g., storage device 430, e.g., an internal disk drive, an external disk drive, a non-volatile memory (e.g., flash memory), etc. In turn, STB 310 can retrieve the HTML file(s) from the data storage device, and display, using the HTML file(s), information representing the event broadcasts and data corresponding to the event broadcasts within scrolling window 130.

In one embodiment, STB 310 can receive different HTML files representing data for respective event broadcasts from broadcast system 1110. In another embodiment, STB 310 can receive one HTML file comprising data for a group of the respective event broadcasts from broadcast system 1110.

In another embodiment, interface component 440 of STB 310 can receive, via wireless interface 305, an input from remote device 320 for associating an entity, e.g., a sports team, with a group of entities, e.g., a group of sports teams. In turn, STB 310 can send a request directed to broadcast system 1110 for facilitating reception of update(s) of the event broadcasts (140, 150, 160, 230, 710, 720) and/or update(s) of the respective data (142, 152, 162, 232, 712, 722) corresponding to the group of entities.

In yet another embodiment, based on the request, STB 310 can periodically, repeatedly, etc. receive the update(s) of the event broadcasts and/or the update(s) of the respective data. In an embodiment, STB 310 can receive the update(s) of the event broadcasts based on a defined schedule, e.g., corresponding to respective initiations of transmissions of the event broadcasts. In this regard, in one embodiment, STB 310 can display a message, broadcast message, etc. within scrolling window 130 representing a starting time, e.g., of the respective initiations of the transmissions of the event broadcasts. In another embodiment, STB 310 can receive the updates of the respective data in response to a determination by broadcast system 1110 that the respective data, e.g., a score of a sporting event, has changed.

In one embodiment, in response to detecting a selection of an identifier (e.g., "1") that has been displayed within scrolling window 130 representing an event broadcast of an event (e.g., event 230), STB 310 can display a selection menu (not shown) for facilitating selection of option(s) comprising a record option to record content of the event broadcast in a storage device (e.g., storage device 430), e.g., while continuing to display a broadcast that is currently being received by STB 310. In this regard, in response to detecting a selection of the record option, STB 310 can record content of the event broadcast in storage device 430 to facilitate playback of the content from storage device 430 at a later time.

In another embodiment, the respective options can comprise a tune, quick tune, etc. option to facilitate reception of the event broadcast and display of the event broadcast in the broadcast window—upon detection of the selection of the identifier that has been displayed within scrolling window 130.

Figure 12:
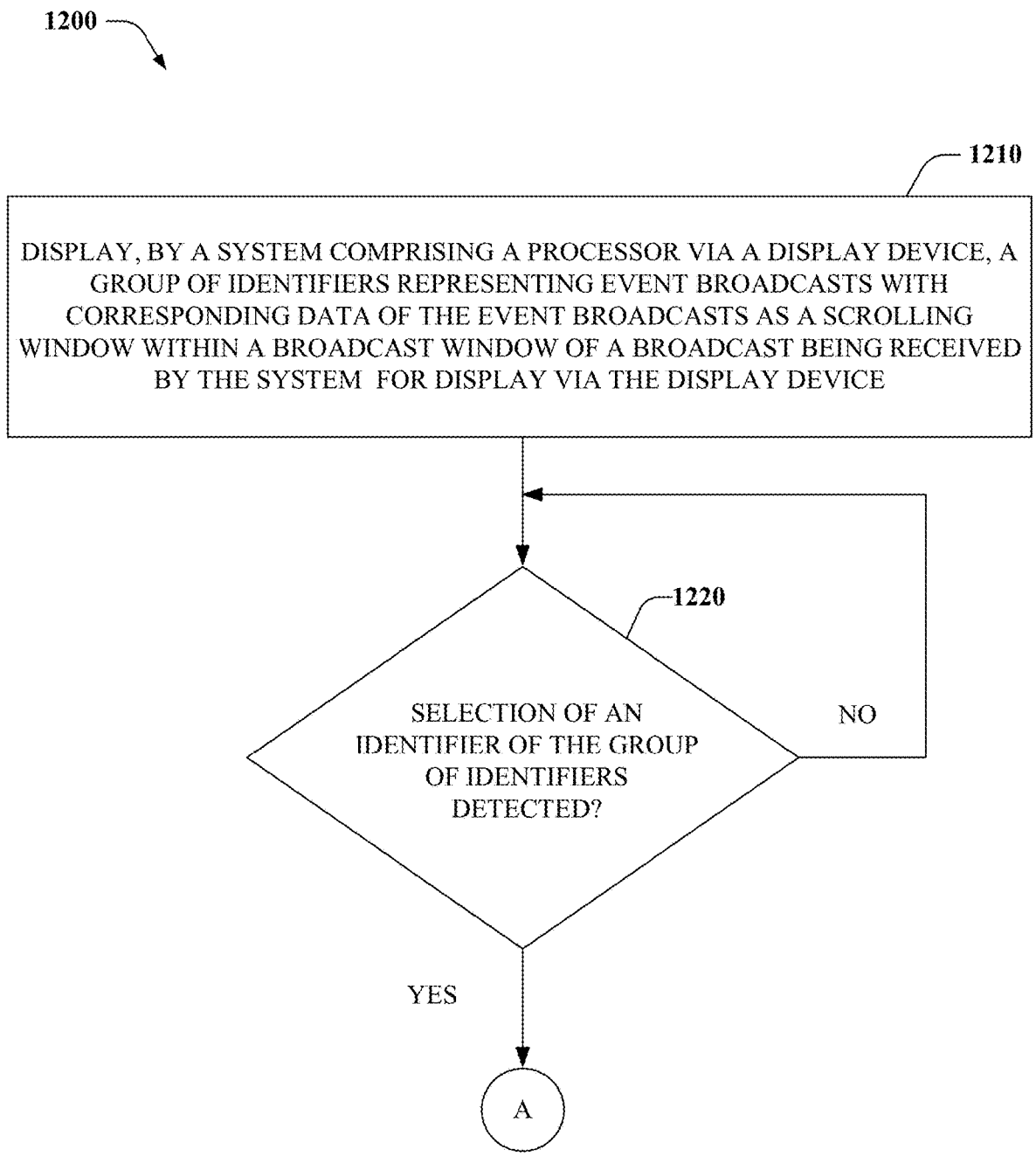
FIGS. 12-13 illustrate block diagrams of a method performed by an STB, in accordance with various example embodiments.
Figure 13:
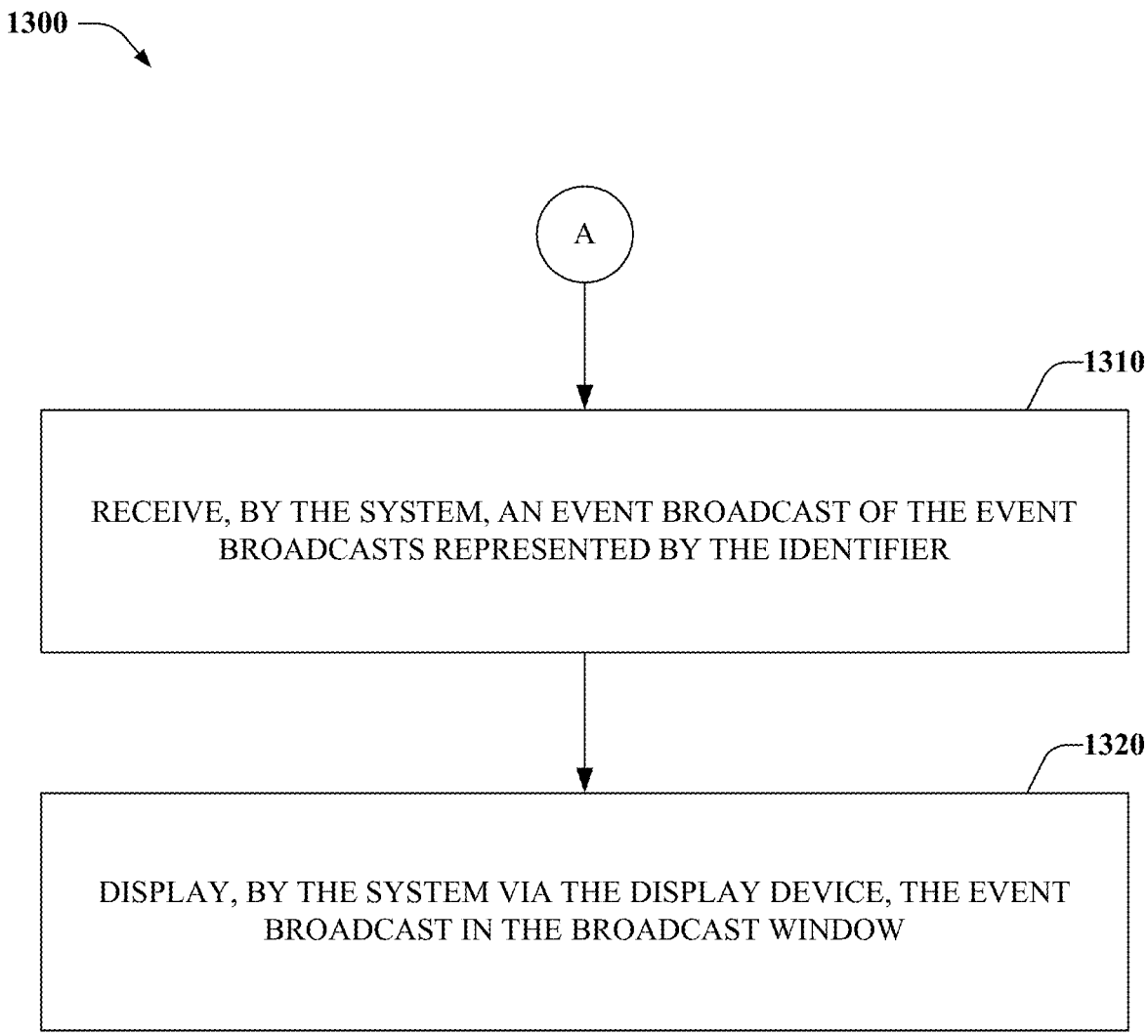
Figure 14:
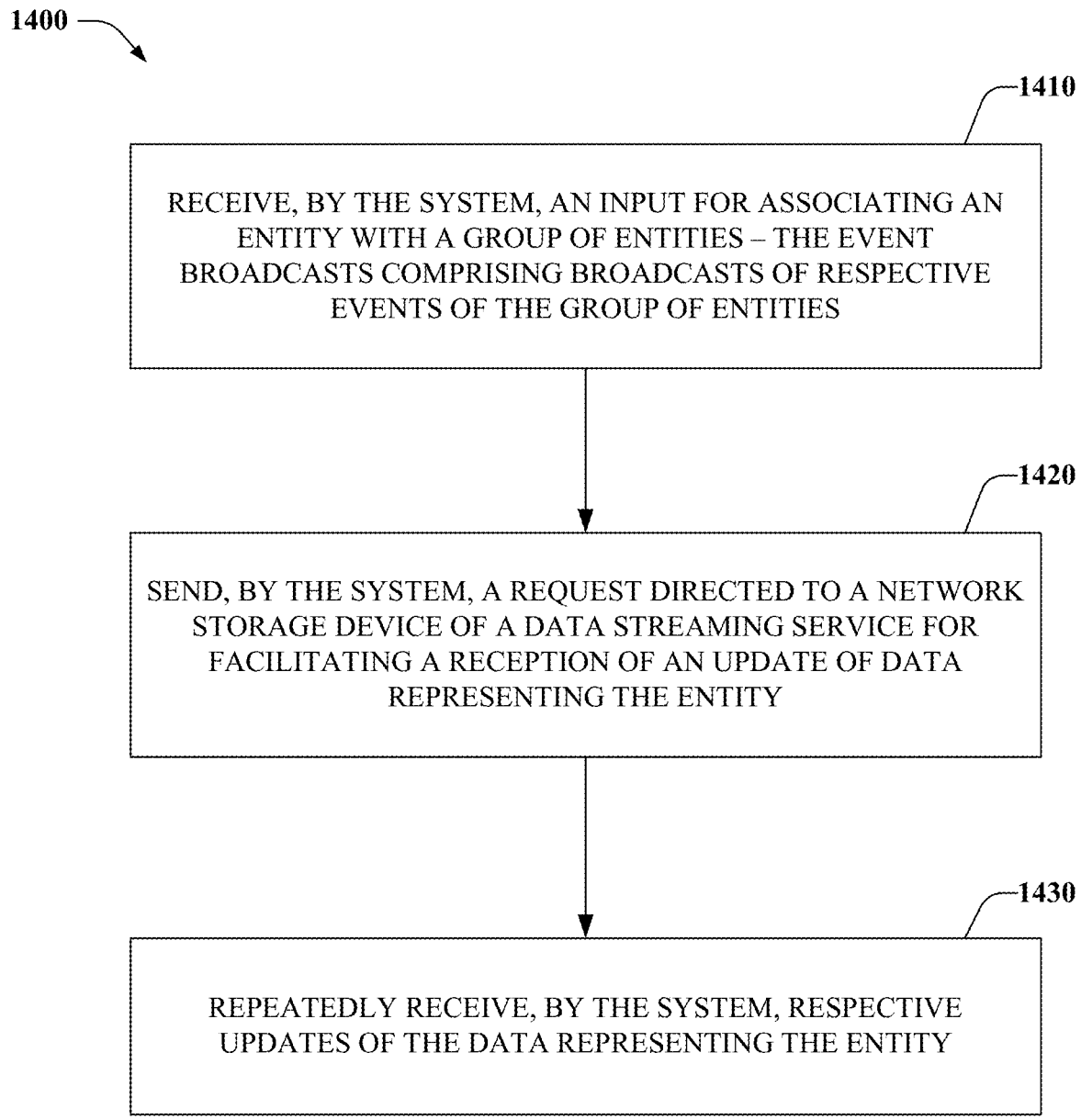
FIG. 14 illustrates a block diagram of another method performed by an STB, in accordance with various example embodiments.

FIGS. 12-14 illustrate methodologies in accordance with the disclosed subject matter. For simplicity of explanation, the methodologies are depicted and described as a series of acts. It is to be understood and appreciated that the subject innovation is not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that some of the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring now to FIGS. 12-13, processes (1200, 1300) performed by an STB (310) are illustrated, in accordance with various example embodiments. At 1210, the STB can display, via a display device, a group of identifiers representing event broadcasts with corresponding data of the event broadcasts as a scrolling window within a broadcast window of a broadcast being received by the STB for display via the display device.

At 1220, it can be determined whether a selection of an identifier of the group of identifiers has been detected. In turn, in response to determining that the selection of the identifier has been detected, flow continues to 1310, otherwise flow returns to 1220.

At 1310, the STB can receive an event broadcast of the event broadcasts represented by the identifier. At 1320, the STB can display, via the display device, the event broadcast in the broadcast window.

FIG. 14 illustrates another process (1400) performed by an STB (310), in accordance with various example embodiments. At 1410, the STB can receive an input for associating an entity with a group of entities, in which the event broadcasts comprise broadcasts of respective events of the group of entities. At 1420, the STB can send a request directed to a network storage device, e.g., broadcast system 1110, of a data streaming service (1105) for facilitating a reception of an update of data representing the entity. At 1430, the STB can repeatedly, periodically, etc. receive respective updates of the data representing the entity.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "storage device," "disk storage," "data store," "data storage," and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can include both volatile and nonvolatile memory.

By way of illustration, and not limitation, nonvolatile memory, for example, can be included in memory 420, storage device 430, non-volatile memory 1522 (see below), disk storage 1524 (see below), and/or memory storage 1546 (see below). Further, nonvolatile memory can be included in read only memory (ROM), programmable ROM (PROM), electrically programmable ROM (EPROM), electrically erasable ROM (EEPROM), or flash memory. Volatile memory 1520 (see below) can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 15:
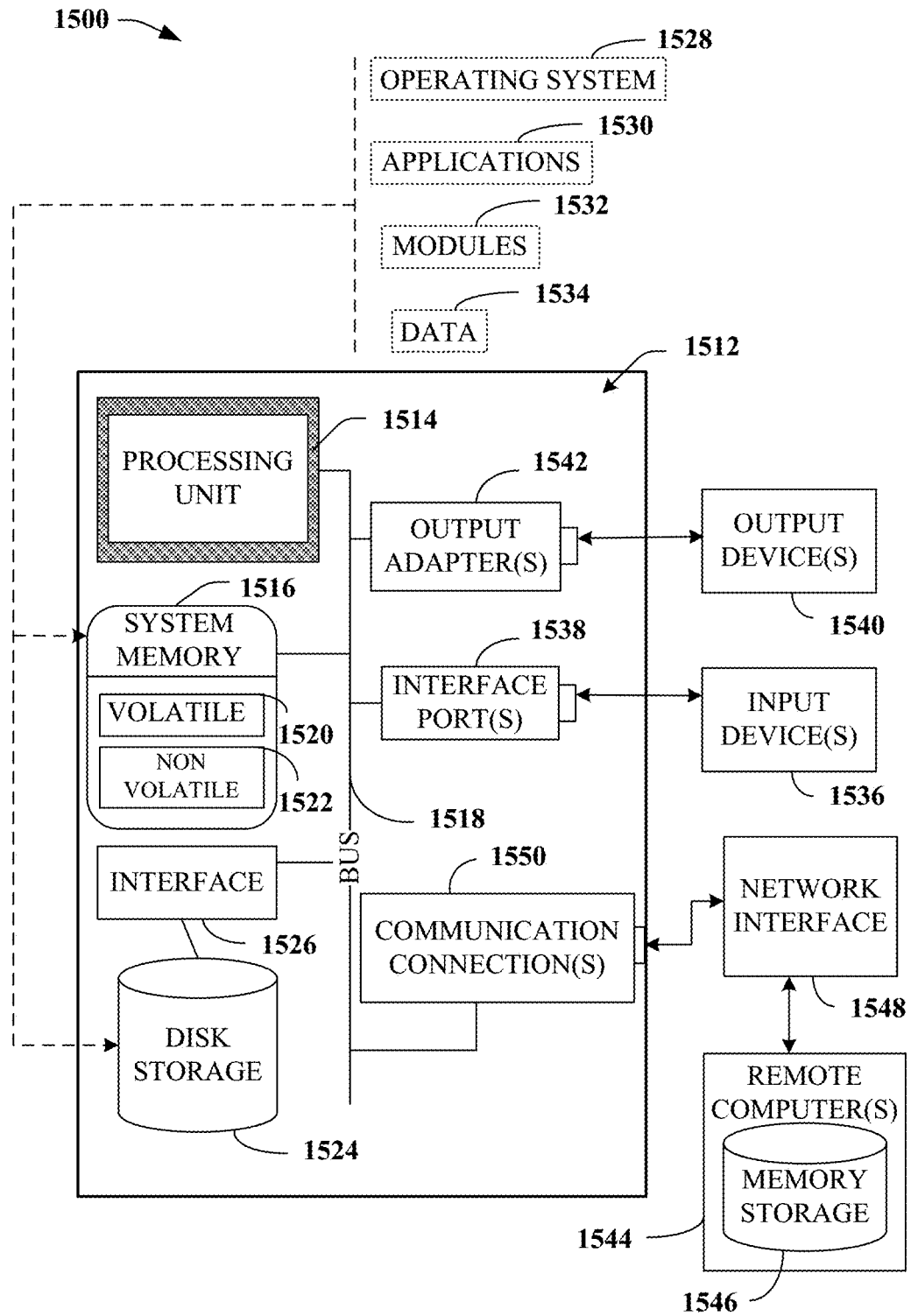
FIG. 15 illustrates a block diagram representing an illustrative non-limiting computing system or operating environment in which one or more aspects of various embodiments described herein can be implemented.

In order to provide a context for the various aspects of the disclosed subject matter, FIG. 15, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the subject innovation also can be implemented in combination with other program modules. Generally, program modules include routines, programs, components, data structures, etc. that perform particular tasks and/or implement particular abstract data types.

Moreover, those skilled in the art will appreciate that the inventive systems can be practiced with other computer system configurations, including single-processor or multi-processor computer systems, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 15, a block diagram of a computing system 1500 operable to execute the disclosed components, systems, devices, etc., e.g., STB 310, is illustrated, in accordance with an embodiment. Computer 1512 includes a processing unit 1514, a system memory 1516, and a system bus 1518. System bus 1518 couples system components including, but not limited to, system memory 1516 to processing unit 1514. Processing unit 1514 can be any of various available processors. Dual microprocessors and other multiprocessor architectures also can be employed as processing unit 1514.

System bus 1518 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), Small Computer Systems Interface (SCSI), and/or controller area network (CAN) bus used in vehicles.

System memory 1516 includes volatile memory 1520 and nonvolatile memory 1522. A basic input/output system (BIOS), containing routines to transfer information between elements within computer 1512, such as during start-up, can be stored in nonvolatile memory 1522. By way of illustration, and not limitation, nonvolatile memory 1522 can include ROM, PROM, EPROM, EEPROM, or flash memory. Volatile memory 1520 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1512 also includes removable/non-removable, volatile/non-volatile computer storage media. FIG. 15 illustrates, for example, disk storage 1524. Disk storage 1524 includes, but is not limited to, devices like a magnetic disk drive, floppy disk drive, tape drive, Jaz drive, Zip drive, LS-100 drive, flash memory card, or memory stick. In addition, disk storage 1524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1524 to system bus 1518, a removable or non-removable interface is typically used, such as interface 1526.

It is to be appreciated that FIG. 15 describes software that acts as an intermediary between users and computer resources described in suitable operating environment 1500. Such software includes an operating system 1528. Operating system 1528, which can be stored on disk storage 1524, acts to control and allocate resources of computer system 1512. System applications 1530 take advantage of the management of resources by operating system 1528 through program modules 1532 and program data 1534 stored either in system memory 1516 or on disk storage 1524. It is to be appreciated that the disclosed subject matter can be implemented with various operating systems or combinations of operating systems.

A user can enter commands or information into computer 1512 through input device(s) 1536. Input devices 1536 include, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1514 through system bus 1518 via interface port(s) 1538. Interface port(s) 1538 include, for example, a serial port, a parallel port, a game port, a universal serial bus (USB), a wireless based port, e.g., WiFi, Bluetooth®, etc. Output device(s) 1540 use some of the same type of ports as input device(s) 1536.

Thus, for example, a USB port can be used to provide input to computer 1512 and to output information from computer 1512 to an output device 1540. Output adapter 1542 is provided to illustrate that there are some output devices 1540, like display devices, light projection devices, monitors, speakers, and printers, among other output devices 1540, which use special adapters. Output adapters 1542 include, by way of illustration and not limitation, video and sound devices, cards, etc. that provide means of connection between output device 1540 and system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. Remote computer(s) 1544 can be a personal computer, a server, a router, a network PC, a workstation, a microprocessor based appliance, a peer device, or other common network node and the like, and typically includes many or all of the elements described relative to computer 1512.

For purposes of brevity, only a memory storage device 1546 is illustrated with remote computer(s) 1544. Remote computer(s) 1544 is logically connected to computer 1512 through a network interface 1548 and then physically and/or wirelessly connected via communication connection 1550. Network interface 1548 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1550 refer(s) to hardware/software employed to connect network interface 1548 to bus 1518. While communication connection 1550 is shown for illustrative clarity inside computer 1512, it can also be external to computer 1512. The hardware/software for connection to network interface 1548 can include, for example, internal and external technologies such as modems, including regular telephone grade modems, cable modems and DSL modems, wireless modems, ISDN adapters, and Ethernet cards.

The computer 1512 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1512 can connect to other devices/networks by way of antenna, port, network interface adaptor, wireless access point, modem, and/or the like.

The computer 1512 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This includes at least WiFi and Bluetooth® wireless technologies. Thus, the communication can be a predefined structure as with a conventional network or simply an ad hoc communication between at least two devices.

WiFi allows connection to the Internet from a desired location (e.g., a vehicle, couch at home, a bed in a hotel room, or a conference room at work, etc.) without wires. WiFi is a wireless technology similar to that used in a cell phone that enables such devices, e.g., mobile phones, computers, etc., to send and receive data indoors and out, anywhere within the range of a base station. WiFi networks use radio technologies called IEEE 802.11 (a, b, g, etc.) to provide secure, reliable, fast wireless connectivity. A WiFi network can be used to connect communication devices (e.g., mobile phones, computers, etc.) to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Further, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art.

As utilized herein, terms "service", "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a computer and the computer can be a component. One or more components can reside within a process, and a component can be localized on one computer and/or distributed between two or more computers.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, the systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, magnetic storage devices, e.g., hard disk; floppy disk; magnetic strip(s); optical disk (e.g., compact disk (CD), digital video disc (DVD), Blu-ray Disc (BD)); smart card(s); and flash memory device(s) (e.g., card, stick, key drive); and/or a virtual device that emulates a storage device and/or any of the above computer-readable media.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used, via STB 310, to perform operations comprising: in response to detecting, via a remote device, a selection of an identifier of a group of identifiers that has been displayed in a scrolling window, receiving, by STB 310, an event broadcast of the event broadcasts represented by the identifier, and displaying, by STB 310, the event broadcast in a broadcast window.

A classifier can be a function that maps an input attribute vector, $x=(x1, x2, x3, x4, xn)$, to a confidence that the input belongs to a class, that is, $f(x)=$confidence (class). Such classification can employ a probabilistic and/or statistical-based analysis (e.g., factoring into the analysis utilities and costs) to infer an action that a user desires to be automatically performed. In the case of communication systems, for example, attributes can be information received from access points, services, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

In accordance with various aspects of the subject specification, artificial intelligence based systems, components, etc. can employ classifiers that are explicitly trained, e.g., via a generic training data, etc. as well as implicitly trained, e.g., via observing characteristics of event notifications reported by a file system, e.g., corresponding to checksum error(s), receiving operator preferences, receiving historical information, receiving extrinsic information, etc. For example, support vector machines can be configured via a learning or a training phase within a classifier constructor and feature selection module. Thus, the classifier(s) can be used by an artificial intelligence system to automatically learn and perform a number of functions, e.g., performed by STB 310, etc.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
in response to receiving, by a system comprising a processor via a satellite receiver device, a first broadcast from a satellite, and in response to receiving, by the system via the satellite receiver device, respective hypertext markup language files comprising corresponding data for event broadcasts comprising the first broadcast, displaying, by the system via a display device of the system, a group of widgets comprising respective identifiers representing the event broadcasts with the corresponding data for the event broadcasts as a scrolling window within a broadcast window of the first broadcast being displayed via the display device;
receiving, by the system, an input that associates an entity corresponding to an event broadcast of the event broadcasts with a group of entities corresponding to a group of the event broadcasts;
in response to sending, to a network device of a data streaming service, a first request for facilitating a first reception of group data representing the group of the event broadcasts, receiving a singular hypertext markup language file of the respective hypertext markup language files comprising the group data representing the group of the event broadcasts;
in response to a cursor of the display device being determined, by the system via position information of the cursor, to be positioned over at least a portion of an element of interaction of the scrolling window corresponding to the singular hypertext markup language file comprising the group data representing the group of the event broadcasts and representing a second broadcast of the event broadcasts,
dividing, by the system, the broadcast window of the first broadcast into respective broadcast windows,
initiating, by the system via the satellite receiver device, a receiving of the second broadcast from the satellite, and
concurrently displaying, by the system via the display device, the first broadcast and the second broadcast in the respective broadcast windows; and
sending, by the system, a second request directed to the network device of the data streaming service for facilitating a second reception of an update of the singular hypertext markup language file comprising the group data representing the group of the event broadcasts.

2. The method of claim 1, wherein the concurrently displaying the first broadcast and the second broadcast comprises:
displaying, below a first broadcast window of the respective broadcast windows corresponding to the first broadcast, the second broadcast in a second broadcast window of the respective broadcast windows.

3. The method of claim 1, further comprising:
storing, by the system, the respective hypertext markup language files in a data storage device.

4. The method of claim 1, further comprising:
in response to the sending the second request, repeatedly receiving, by the system, respective updates of the singular hypertext markup language file comprising the group data representing the group of the event broadcasts.

5. The method of claim 1, further comprising:
in response to detecting, via a remote device, a first selection of an identifier of the respective identifiers representing the second broadcast, displaying, by the system via the display device, a selection option menu for facilitating a second selection of respective options comprising a record option to record content of the second broadcast while the first broadcast is being received by the system and being displayed by the display device.

6. The method of claim 5, wherein the broadcast window is a first broadcast window, and wherein the displaying the selection option menu comprises displaying the selection option menu for facilitating a third selection of the respective options comprising a tune option to receive the second broadcast and perform the displaying the second broadcast in a second broadcast window of the respective broadcast windows.

7. The method of claim 1, wherein the portion is a first portion, and further comprising:
based on a defined schedule of the event broadcasts, displaying, by the system via the display device, a message within the scrolling window representing a starting time of a second portion of the event broadcasts.

8. A system, comprising:
a processor; and
a memory that stores executable instructions that, when executed by the processor, facilitate performance of operations, the operations comprising:
displaying, in a first area of a graphical user interface of a display of the system, first content of a first broadcast being received by the system via a satellite-based wireless receiver;
in response to receiving, via the satellite-based wireless receiver, hypertext markup language files comprising respective data corresponding to broadcasts comprising the first broadcast, scrolling a first portion of the respective data corresponding to the hypertext markup language files and a second portion of the respective data corresponding to the hypertext markup language files in a second area of the graphical user interface of the display, wherein the first portion of the respective data corresponding to the hypertext markup language files comprises widgets representing respective identifiers of the broadcasts, wherein the second portion of the respective data corresponding to the hypertext markup language files comprises respective information of the broadcasts, and wherein the widgets comprise elements of interaction in the graphical user interface of the display;

based on an input, associating an entity corresponding to a broadcast of the broadcasts with a watch group of entities corresponding to a group of broadcasts of the broadcasts;

in response to sending a first request to a network device of a data streaming service to initiate a first reception of data representing the group of broadcasts, receiving a hypertext markup language file of the hypertext markup language files comprising the data representing the group of broadcasts;

in response to a cursor of the display being determined, by the system, to be positioned over a widget of the widgets comprising an identifier of the respective identifiers corresponding to the hypertext markup language file comprising the data representing the group of broadcasts and representing a second broadcast of the broadcasts, performing a fast tune of the second broadcast comprising dividing the first area of the display into a first display window and a second display window, concurrently receiving, via the satellite-based wireless receiver, the first broadcast and the second broadcast, and concurrently displaying second content of the second broadcast in the second display window while displaying the first content in the first display window; and sending a second request to the network device of the data streaming service for facilitating a second reception of an update of the hypertext markup language file comprising the data representing the group of broadcasts.

9. The system of claim 8, wherein the displaying the first content comprises displaying the first content in the first display window above the second display window.

10. The system of claim 8, wherein the receiving the hypertext markup language files comprises:
at different times, receiving the hypertext markup language files; and
storing the hypertext markup language files in a data storage device.

11. The system of claim 8, wherein the selection is a first selection, and wherein the operations further comprise:
displaying a selection menu for facilitating selection of respective options comprising a record option to record the second content; and
in response to detecting a second selection of the record option, recording the second content in a storage device to facilitate playback of the second content from the storage device.

12. The system of claim 8, wherein the broadcasts comprise a sports event of a defined team, wherein the respective information comprises a score of the sports event, and wherein the second broadcast comprises a broadcast corresponding to the sports event.

13. The system of claim 8, wherein the broadcasts comprise an election event of a defined entity, wherein the respective information comprises a result of the election event, and wherein the second broadcast comprises a broadcast corresponding to the election event.

14. The system of claim 8, wherein the broadcasts comprise a financial market event of a defined entity, wherein the respective information comprises a result of the financial market event, and wherein the second broadcast comprises a broadcast corresponding to the financial market event.

15. The system of claim 8, wherein the broadcasts comprise an award ceremony corresponding to a defined entity, wherein the respective information comprises a result of the award ceremony, and wherein the second broadcast comprises a broadcast corresponding to the award ceremony.

16. A non-transitory machine-readable storage medium, comprising executable instructions that, when executed by a system comprising a processor, facilitate performance of operations, comprising:
displaying, in a viewing area of a graphical user interface of the system, first content of a first broadcast being received by a satellite-based wireless receiver of the system;

associating an entity corresponding to a second broadcast with a group of entities corresponding to a group of broadcasts comprising the second broadcast;

in response to sending a first request to a network device of a data streaming service for facilitating a first reception of information representing the group of broadcasts, receiving a hypertext markup language file of respective hypertext markup language files comprising information representing the group of broadcasts, the information comprising an identifier of second content of the second broadcast;

in response to the receiving, displaying, in a scrolling portion of the viewing area, first information comprising a widget comprising an element of interaction in the graphical user interface comprising the identifier of the second content of the second broadcast for facilitating a display, in the viewing area, of the second content of the second broadcast, and displaying, in the scrolling portion of the viewing area, second information corresponding to the second content of the second broadcast;

in response to detecting, based on a movement of a cursor over the widget in the viewing area, a selection of the identifier of the second content of the second broadcast corresponding to the hypertext markup language file, splitting the viewing area to obtain a first viewing area and a second viewing area, receiving, via the satellite-based wireless receiver, the second broadcast, and displaying the first content of the first broadcast in the first viewing area while displaying the second content of the second broadcast in the second viewing area; and sending a second request directed to the network device of the data streaming service for facilitating a second reception of an update of the hypertext markup language file comprising the information representing the group of broadcasts.

17. The non-transitory machine-readable storage medium of claim 16, wherein the first viewing area is displayed above the second viewing area.

18. The non-transitory machine-readable storage medium of claim 16, wherein the operations further comprise:
storing the hypertext markup language file in a memory of the system.

19. The non-transitory machine-readable storage medium of claim 16, wherein the operations further comprise:
- based on a defined schedule of the group of broadcasts, displaying a message within the scrolling portion of the viewing area representing a starting time of a portion of the group of broadcasts.

20. The non-transitory machine-readable storage medium of claim 16, wherein the operations further comprise:
- at different times, receiving the hypertext markup language files comprising the hypertext markup language file; and
- storing the hypertext markup language files in a data storage device.

\* \* \* \* \*